United States Patent
Kobayashi (10) Patent No.: US 9,400,730 B2
(45) Date of Patent: Jul. 26, 2016

(54) VIRTUAL MACHINE SYSTEM AND METHOD OF MEASURING PROCESSOR PERFORMANCE

(71) Applicant: HITACHI, LTD., Tokyo (JP)

(72) Inventor: Yuji Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 14/244,732

(22) Filed: Apr. 3, 2014

(65) Prior Publication Data

US 2014/0380309 A1  Dec. 25, 2014

(30) Foreign Application Priority Data

Jun. 19, 2013  (JP) .................... 2013-128253

(51) Int. Cl.
*G06F 9/455* (2006.01)
*G06F 11/34* (2006.01)

(52) U.S. Cl.
CPC ............ *G06F 11/34* (2013.01); *G06F 9/45558* (2013.01)

(58) Field of Classification Search
None
See application file for complete search history.

(56) References Cited

U.S. PATENT DOCUMENTS

| | | | | |
|---|---|---|---|---|
| 7,702,843 B1* | 4/2010 | Chen | ................. | G06F 9/5016 711/6 |
| 8,181,175 B1* | 5/2012 | McKee | ............... | G06F 11/3419 718/1 |
| 2009/0007112 A1 | 1/2009 | Moriki et al. | | |
| 2010/0169882 A1* | 7/2010 | Ben-Yehuda | ....... | G06F 9/45537 718/1 |
| 2013/0254383 A1* | 9/2013 | Wray | ..................... | H04L 47/70 709/224 |

FOREIGN PATENT DOCUMENTS

JP  2009-3749 A  1/2009

* cited by examiner

*Primary Examiner* — Gregory A Kessler
(74) *Attorney, Agent, or Firm* — Mattingly & Malur, PC (57) ABSTRACT

In a virtual machine system where a first stage VM and a second stage VM generated on the first stage VM are executed, a processor is configured to perform a first determination as to whether to physically instruct to start execution caused by a virtual execution start of the second stage VM and a second determination as to whether a physical end is detected as a result of a virtual end of the second stage VM, and calculate an execution time of the second stage VM based on results of the first determination and the second determination.

10 Claims, 9 Drawing Sheets

| 180 | Final execution start time point (201) | Final execution end time point (202) | Total execution time (203) |
|---|---|---|---|
| Guest VMM (101) | 2013/01/23 19:21:28 480108 | 2013/01/23 19:21:28 480627 | 8938.234753 |
| Second stage VM (120) | 2013/01/23 19:21:28 472984 | 2013/01/23 19:21:28 480205 | 20345.513492 |
| Second stage VM (130) | 2013/01/23 19:21:28 480627 | 2013/01/23 19:21:28 490108 | 12393.154398 |
| ... | ... | ... | ... |

FIG. 3

*Related Art*

|  | Final execution start time point | Final execution end time point | Total execution time |
|---|---|---|---|
| Host VMM | 2013/01/23 18:15:30 836218 | 2013/01/23 18:15:30 836264 | 126487.967284 |
| First stage VM | 2013/01/23 18:15:30 836264 | 2013/01/23 18:15:30 824981 | 131550.76258 |
| First stage VM | 2013/01/23 18:15:30 825273 | 2013/01/23 18:15:30 836218 | 42491.643762 |
| ... | ... | ... | ... |

| 160 | Final execution start time point (401) | Final execution end time point (402) | Total execution time (403) |
|---|---|---|---|
| Host VMM (50) | 2013/01/23 18:15:30 843921 | 2013/01/23 18:15:30 843985 | 126487.967284 |
| Guest VMM (101) | 2013/01/23 18:15:30 836264 | 2013/01/23 18:15:30 843893 | 38825.528283 |
| Second stage VM (120)/second stage VM (130) | 2013/01/23 18:15:30 843985 | 2013/01/23 18:15:30 824981 | 92725.234297 |
| First stage VM (110) | 2013/01/23 18:15:30 825273 | 2013/01/23 18:15:30 836218 | 42491.643762 |
| ... | ... | ... | ... |

FIG. 8

| 80 | Previously-acquired total execution time (501) | Presently-acquired total execution time (502) | Execution time/acquiring -cycle time (503) |
|---|---|---|---|
| Host VMM (50) | 126487.886661 | 126487.967284 | 0.080623 |
| Guest VMM (101) | 38825.446426 | 38825.528283 | 0.081857 |
| Second stage VM (120)/second stage VM (130) | 92724.80947 | 92725.234297 | 0.424827 |
| First stage VM (110) | 42491.231069 | 42491.643762 | 0.412693 |
| ... | ... | ... | ... |

| 160' | Final execution start time point | Final execution end time point | Total execution time |
|---|---|---|---|
| Host VMM (50) | 2013/01/23 18:15:30 843921 | 2013/01/23 18:15:30 843985 | 126487.967284 |
| Guest VMM (101) | 2013/01/23 18:15:30 836264 | 2013/01/23 18:15:30 843893 | 38825.528283 |
| Second stage VM (120) | 2013/01/23 18:15:30 822756 | 2013/01/23 18:15:30 833167 | 47352.934824 |
| Second stage VM (130) | 2013/01/23 18:15:30 843985 | 2013/01/23 18:15:30 824981 | 45372.299473 |
| First stage VM (110) | 2013/01/23 18:15:30 825273 | 2013/01/23 18:15:30 836218 | 42491.643762 |
| ... | ... | ... | ... |

VIRTUAL MACHINE SYSTEM AND METHOD OF MEASURING PROCESSOR PERFORMANCE

CROSS-REFERENCE TO PRIOR APPLICATION

This application relates to and claims the benefit of priority from Japanese Patent Application number 2013-128253, filed on Jun. 19, 2013 the entire disclosure of which is incorporated herein by reference.

BACKGROUND

The present invention generally relates to measuring performance of a processor in a virtual machine system which executes a second stage VM (Virtual Machine) on a first stage VM.

Generally, the complexity in operation is increased as the number of servers increases, and as a result, an operation cost becomes a problem. As a technology of reducing the operation cost, the server integration of collecting a plurality of servers into one server has received attention. As a technology of realizing the server integration, it is known a virtual machine technology (a virtual computer technology) of logically dividing one computer at an arbitrary ratio. In the virtual machine technology, for example, firmware such as a hypervisor (or middleware) divides a physical computer (physical machine) into a plurality of logical partitions (LPARs: Logical PARtitions), allocates a computer resource (a processor, a memory, and an I/O (Input/Output) device, typically) to each LPAR, and operates each OS (Operating System) on each LPAR. Otherwise, one host OS (an OS which directly uses the physical computer) is executed on one server, and a hypervisor operated on the host OS performs a dividing process in much the same way as the above so as to operate a plurality of guest OSs (OSs operated on the host OS). The virtual machine technology enables the OS operated in the plurality of servers and software operated on the OS to be operated in one server, whereby, the server integration is realized.

Moreover, generally, the virtual machine technology is a technology used in a large computer such as the general-purpose machine (Mainframe), and as a recent performance of a microprocessor is improved, the technology is gradually prevailed in a low-end server. A computer such as a server in which the virtual machine technology is adopted has a plurality of virtual machines which operate a guest (a general term for the guest OS and the software operated on the guest OS) and a virtual machine monitor (mentioned as "VMM", hereinafter) which controls the virtual machine.

A processor is known which provides and expands a function of supporting the VMM. One example of the processor is an x86 processor. Especially among the low-end servers, the x86 processor provides and expands the function of supporting the VMM, the x86 server mounted with the x86 processor improves performance of the virtual machine. It is presumed that performance of the x86 server will be continuously improved in the future, and therefore, the number of the guests capable of being operated on one server tends to be increased.

If this tendency continues, then there will be a concern that a number of guests may be stopped at the same time when a failure occurs. This concern may be efficiently addressed by an occupying system. In the occupying system, the computer resource (the processor, the memory, and the I/O (Input/Output) device, typically) is occupied by a single guest so as to minimize a range of influence at a time of the failure, and thereby, a reliability is improved. On the other hand, there is also, for the VMM, a sharing system in which the computer resource is shared by a plurality of guests. The sharing system is capable of flexibly allocating the computer resource by utilizing an idle time of the computer resource, etc., and has a merit of improving a convenience.

Since both of the reliability and the convenience are important, it is expected to establish a method of balancing the reliability with the convenience by operating a VMM (a host VMM) of the occupying system and a VMM (a guest VMM) of the sharing system together between the server and the OS. This style may be called a "two-level virtual machine system" (or a multi-layer virtual machine system). However, the x86 processor corresponds only to a one-level virtual machine system (a system in which the host VMM exists but the guest VMM does not exist). Hereinafter, a function implemented in the x86 processor is summarized.

The x86 processor has a function of starting an operation of a guest and an assist function of calling a VMM by suspending the operation of the guest when a specific event occurs upon monitoring the operation of the guest. The assist function is called VT (Virtualization Technology) in a processor of Intel Corporation, whereas is called SVM (Secure Virtual Machine) in a processor of AMD, Inc., for example. Moreover, starting the operation of the guest is called "VMENTRY", and suspending the operation of the guest is called "VMEXIT".

In the assist function, a state of the processor during the operation of the guest is saved or restored in the memory at a time of suspending or restarting the operation of the guest. When the guest performs an operation (power-off, for example) influencing another guest, the VMM uses the assist function so as to perform emulation (an alternative process) of stopping execution of the guest, etc., instead of turning off power of the server. Upon the emulation, the VMM changes a state of the guest in the memory.

A condition to call the VMM is different depending on a policy of the VMM. For example, in the sharing system, another guest may be influenced when the guest operates the I/O, and therefore, it is required to restrict access of the guest. However, in the occupying system, the guest may operate the I/O. Therefore, according to the x86 processor, it becomes possible to finely set a VMM calling condition corresponding to a difference in the policy of the VMM. Moreover, it becomes possible to designate a region used for saving and restoring the state of the guest. The VMM calling condition and the region used for saving and restoring the state of the guest are included in a data structure called VMCS (Virtual Machine Control Structure) in the processor of Intel Corporation, and are referred from a VMCS pointer within the processor. Similarly, they are included in a data structure called VMCB (Virtual Machine Control Block) in the processor of AMD, Inc., and are referred from a VMCB pointer within the processor.

Since the x86 processor corresponds to only the one-level virtual machine system, the host VMM operates the guest VMM by emulating the assist function in order to construct the two-level virtual machine system (Patent Application Laid-Open Publication No. 2009-3749). The host VMM creates or manages two types of VMCS (the VMCB, if the processor of AMD, Inc.: hereinafter, the same applies) corresponding to an operation subject (the guest VMM or the guest OS). Moreover, the host VMM also refers or updates the VMCS created by the guest VMM as required. Hereinafter, VMCS which is created or managed by the host VMM and corresponds to the guest VMM is mentioned as "host VMCS for guest VMM", VMCS which is created or managed by the host VMM and corresponds to the guest OS is mentioned as "host VMCS for guest OS", and VMCS which is created by the guest VMM is mentioned as "guest VMCS".

SUMMARY

In the virtual machine system, generally, an execution time of the VMM and an execution time of each guest are acquired as performance information of the processor. In the two-level virtual machine system, each of the host VMM and the guest VMM acquires an execution time (performance information) of the processor.

However, these VMMs do not acquire the execution time of the processor with considering the two-level virtual machine system. Specifically, the host VMM is not capable of acquiring the execution time of a second stage VM. On the other hand, the guest VMM is capable of acquiring the execution time of the second stage VM, however, the execution time is equivalent to performance of a virtual processor in a first stage VM (a virtual resource based on the processor (a physical processor) in the virtual machine system). It is possible to presume performance of the physical processor of the second stage VM from a ratio of the virtual processor to the physical processor and the execution time of the second stage VM acquired by the guest VMM, however, the presumed performance is not accurate.

As described above, in the two-level virtual machine system, it is impossible to acquire information for accurately grasping the performance of the physical processor of the second stage VM (in other words, influence to the physical processor of the second stage VM). This type of problem may occur when a processor other than the x86 processor is used as the physical processor.

In the virtual machine system executing a first stage VM and a second stage VM generated on the first stage VM, a processor is configured to perform a first determination as to whether to physically instruct to start execution caused by a virtual execution start of the second stage VM and a second determination as to whether a physical end is detected as a result of a virtual end of the second stage VM, and calculate an execution time of the second stage VM based on results of the first determination and the second determination.

Accuracy of the performance of the physical processor grasped with respect to the second stage VM can be improved.

DETAILED DESCRIPTION OF EMBODIMENTS

Hereinafter, some embodiments will be explained.

In the description below, information is occasionally explained with an expression "xxx table", but the information may be expressed by any data structure. Namely, in order to show that the information does not rely on a data structure, "xxx table" may be mentioned as "xxx information."

Also, in the following description, a process may be explained with "program" as the subject. However, a program is executed by a processor (for example, a CPU (Central Processing Unit)), thereby a predetermined process being performing by properly using at least one of a storage device (for example, a memory) and a communication interface device (for example, a communication port), and thus the subject of a process may be a processor. The process that is explained with a program as the subject, may be a process that is performed by a processor or a system having the processor. Also, a processor may be a CPU itself or may include a hardware circuit that performs a portion of or an entire process performed by a processor. A program may be installed from a program source. The program source may be, for example, a program distribution server or a storage media. The program distribution server may be a management computer.

Embodiment 1

Figure 1:
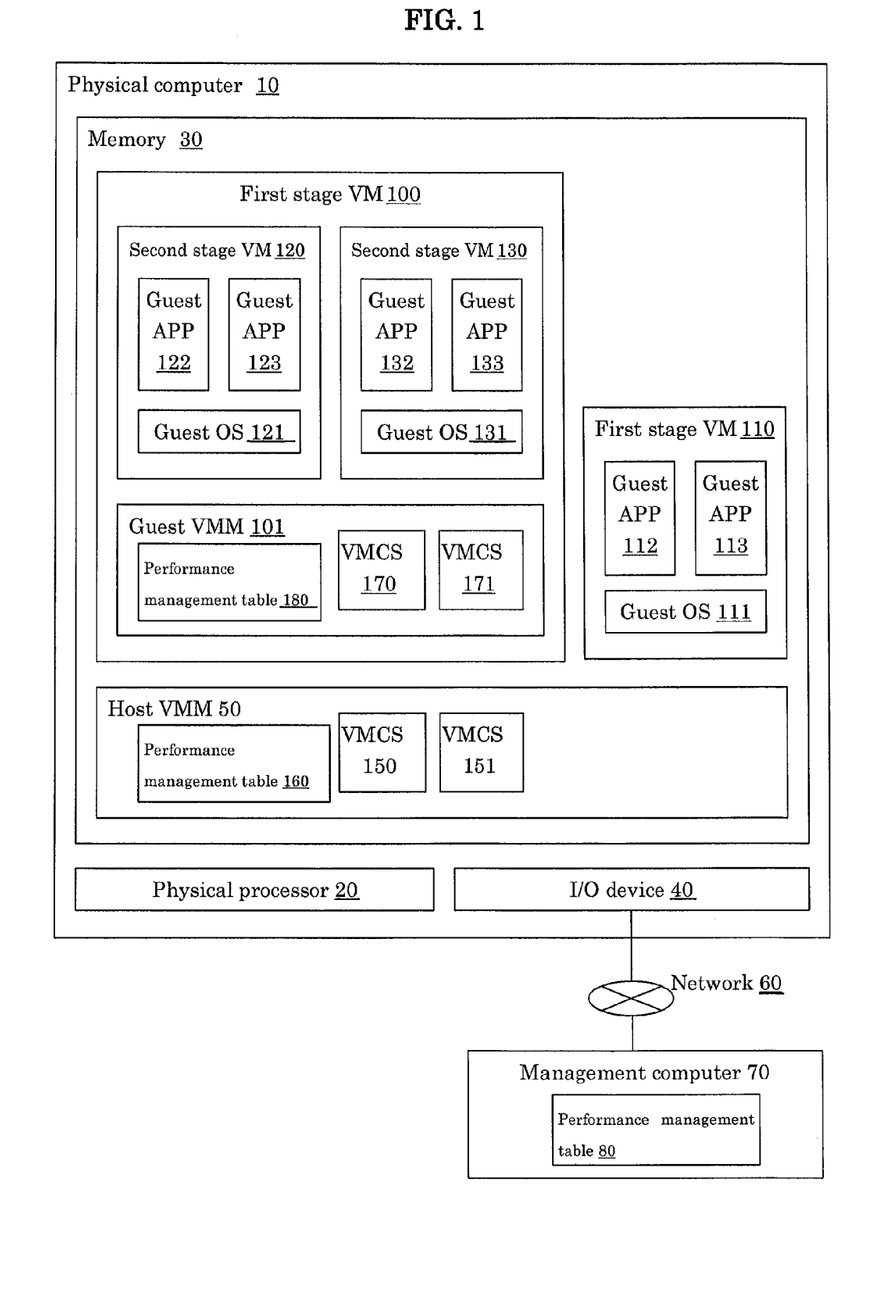
FIG. 1 is a block diagram of a computer system according to an embodiment 1.

FIG. 1 is a block diagram of a computer system according to an embodiment 1.

The computer system has a physical computer (physical machine) 10 and a management computer 70.

The physical computer 10 iS one example of a two-level virtual machine system. The physical computer 10 has a physical processor 20, provided with a virtualization support function, which executes an arithmetic processing, a memory 30 which stores data and program, and an I/O (Input/Output) device 40 for transmitting and receiving data to and from an external device of the physical computer 10. The physical processor 20 is coupled to the memory 30 and the I/O device 40. The I/O device 40 is configured by a network interface and a host bus adapter, for example. Moreover, the physical processor 20 may include a plurality of processors or a processor provided with a plurality of arithmetic cores. Moreover, the "virtualization support function" may include a function of starting an operation of a guest and an assist function of calling a VMM (Virtual Machine Monitor) by suspending the operation of the guest when a specific event occurs upon monitoring the operation of the guest.

In the physical computer 10, a host VMM 50 is executed. In order to operate a plurality of first stage VMs (Virtual Machines) (virtual computers) 100 and 110, the host VMM 50 virtualizes a physical resource of the physical computer 10 to convert the resource into a virtual resource, and allocates the virtual resource to each first stage VM. The host VMM 50 is one example of a virtualization mechanism, and is a hypervisor, for example. The host VMM 50 may be a program read into the memory 30 and executed in the physical processor 20, however, a part of or whole functions of the host VMM 50 may be realized in a hardware circuit. It is noted that, a technology of allocating the virtual resource (a virtual processor, a virtual memory, and a virtual I/O device, for example) based on the physical resource of the physical computer 10 (the physical processor 20, the physical memory 30, and the physical I/O device 40, for example) to each first stage VM is well-known, and therefore, will not be described in detail here. Moreover, the number of the first stage VMs is two in the example shown in FIG. 1, however, may be one, or equal to or larger than three.

In the first stage VM, a guest OS or a guest VMM is operated. As an example in which the guest OS is operated, a guest OS 111 is operated on the first stage VM 110, and guest APPs 112 and 113 are executed on the guest OS 111. Each of the guest APPs is an application program executed on the guest OS. As an example in which the guest VMM is operated, a guest VMM 101 is operated on the first stage VM 100, and second stage VMs 120 and 130 are executed on the guest VMM 101. A guest OS 121 (131) is operated on the second stage VM 120 (130), and guest APPs 122 and 123 (132 and 133) are executed on the guest OS 121 (131). In the first stage VM, each of the numbers of the guest OSs and the guest VMMs may be equal to or larger than two. Moreover, in the second stage VM, the number of the guest OSs may be equal to or larger than two. Moreover, in the second stage VM, the number of the guest APPs may be one, or equal to or larger than three.

The host VMM 50 operates the first stage VMs 100 and 110 by creating and managing the first stage VMs 100 and 110 and host VMCSs (Virtual Machine Control Structures) 150 and 151 respectively corresponding to the first stage VMs 100 and 110. Since the first stage VM 100 operates the guest VMM 101, the corresponding host VMCS 150 is a host VMCS for a guest VMM. On the other hand, since the first stage VM 110 operates the guest OS 111, the corresponding host VMCS 151 is a host VMCS for a guest OS. Moreover, the VMCS is equivalent to a data structure called VMCB (Virtual Machine Control Block) in case of the processor of AMD, Inc., however, the VMCS is a data structure related to the processor of Intel Corporation, and information such as the VMCS and the VMCB is one example of control information for the VM.

Similarly, the guest VMM 101 operates the second stage VMs 120 and 130 by creating and managing the second stage VMs 120 and 130, and guest VMCSs 170 and 171 respectively corresponding to the second stage VMs 120 and 130. The guest VMM 101 is a virtual hypervisor, for example.

With respect to the physical processor 20, the host VMM 50 acquires an execution time (performance information) of the host VMM 50 and an execution time of each of the first stage VMs, and records the acquired execution times in a performance management table 160. The performance management table 160 is a table in which the execution time acquired by the host VMM 50 is recorded. The performance management table 160 may exist for each of the physical processors 20.

Similarly, with respect to the virtual processor, the guest VMM 101 acquires an execution time of the guest VMM 101 and an execution time of each of the second stage VMs, and records the acquired execution times in a performance management table 180. The performance management table 180 is a table in which the execution time acquired by the guest VMM 101 is recorded. The performance management table 180 may exist for each of the virtual processors. The virtual processor is one of resources included in the virtual resource, and is a resource based on the physical processor 20.

The physical processor 20, for example, the host VMM 50 (and the guest VMM 101) may output information included in the table 160 (and the table 180) to the management computer 70 in response to a request from the management computer 70.

The physical computer 10 is coupled to the management computer 70 by the I/O, device 40 via a network (Internet, for example) 60. The management computer 70 may be a computer having an I/O device which is an interface device for communicating with the I/O device 40, a memory, and a processor coupled thereto. The processor of the management computer 70 periodically acquires the information included in the performance management table 160 (and the table 180) from the host VMM 50 (and the guest VMM 101) so as to update a performance management table 80 based on the acquired information. The performance management table 80 is stored into the memory of the management computer 70, for example. The management computer 70 may display information based on the performance management table 80. Specifically, for example, the management computer 70 may have a display device so as to display the information based on the performance management table 80 on the display device, or may transmit the information based on the performance management table 80 to a computer for display which is a remote computer having the display device, as information for display.

Figure 2:
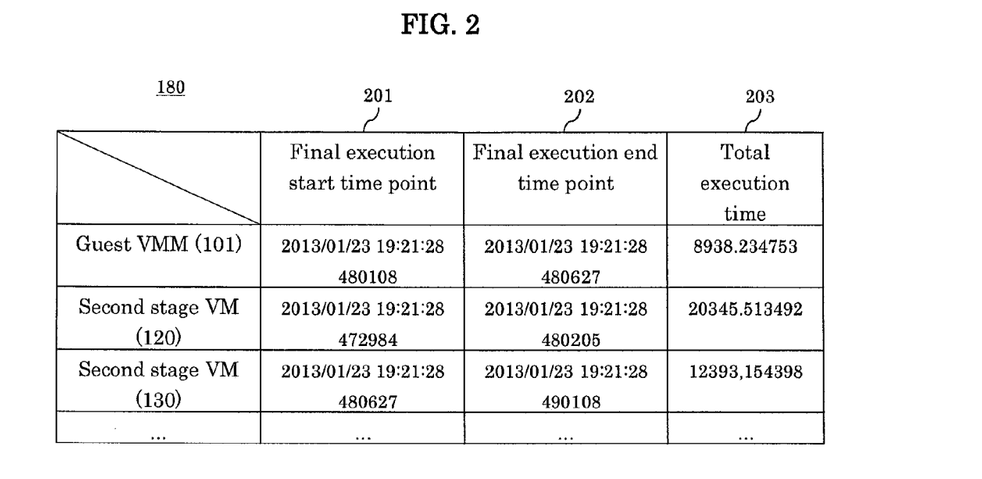
FIG. 2 shows one example of a performance management table 180 according to the embodiment 1.

FIG. 2 shows one example of the performance management table 180.

With respect to a program of each of the guest VMM 101, and the second stage VIVI 120 and the second stage VM 130 executed by the guest VMM 101, the performance management table 180 has a final execution start time point 201, a final execution end time point 202, and a total execution time 203. The final execution start time point 201 represents the latest execution start time point of the program. The final execution end time point 202 represents the latest execution end time point of the program. The total execution time 203 represents an accumulated value of an execution time of the program. The latest execution time of the program is a difference between the final execution end time point 202 and the final execution start time point 201 of the program.

The guest VMM 101 initializes at first each of the total execution times 203 in all rows by an initial value. When execution of the guest VMM 101, the second stage VM 120, or the second stage VM 130 is started, the guest VMM 101 updates a final execution start time point 201 corresponding to a program to be a target of execution to a time point when execution thereof is started. Moreover, when execution of the guest VMM 101, the second stage VM 120, or the second stage VM 130 is ended, the guest VMM 101 updates a final execution end time point 202 to a time point when execution thereof is ended. Thereafter, the guest VMM 101 adds the difference between the final execution end time point 202 and the final execution start time point 201 to a total execution time 203 corresponding to a program to be a target of ending execution.

Figure 3:
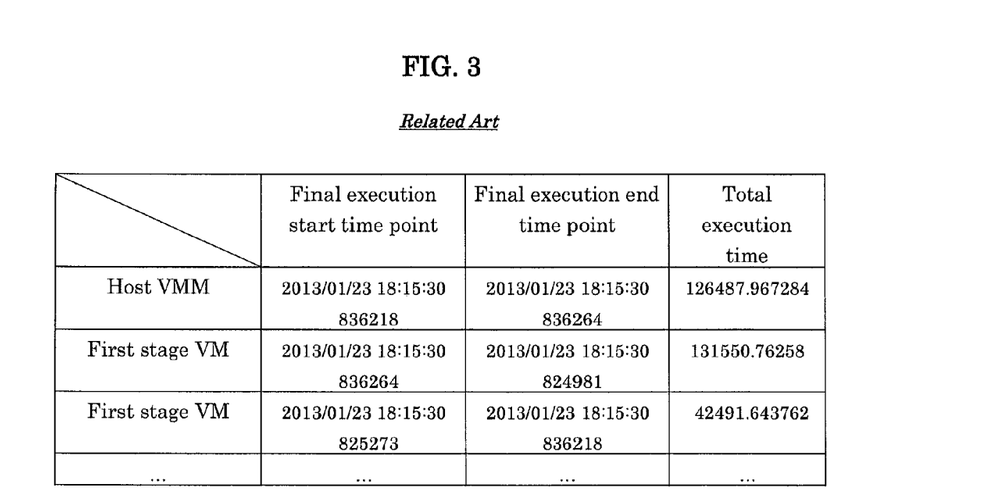
FIG. 3 shows a comparative example of a performance management table 160 according to the embodiment 1.

FIG. 3 shows a comparative example of the performance management table 160.

A table shown in FIG. 3 is a conventional type table (hereinafter, a conventional table) managed by the host VMM. The conventional table has a final execution start time point, a final execution end time point, and a total execution time with respect to a program of each of the host VMM and a first stage VM executed by the host VMM (meanings of the final execution start time point, the final execution end time point, and the total execution time are substantially the same as the above-described information 201 to 2013, respectively).

However, according to the conventional table, the host VMM does not manage a final execution start time point, a final execution end time point, and a total execution time with respect to the second stage VM. Therefore, it is impossible to know performance of the physical processor of the second stage VM from the conventional table.

Moreover, even if both of the conventional table and the performance management table 180 shown in FIG. 2 are used, although it may be possible to presume the performance of the physical processor of the second stage VM, it is impossible to accurately grasp the performance of the physical processor of the second stage VM.

In this embodiment, the host VMM is configured to be capable of starting execution of the second stage VM based on a trigger of ending the guest VMM. Moreover, the host VMM is configured to be capable of determining which of the first stage VM and the second stage VM causes each of starting and ending the host VMM, so as to acquire the execution time of the second stage VM based on the determination result. Hereinafter, the detailed description will be provided with a particular focus on this. It is noted that, in a following description, one example of a command for starting execution of a guest (a program, such as the guest VMM and second stage VM, on the host VMM 50) is mentioned as "VMENTRY". Specifically, VMENTRY by the host VMM is mentioned as "physical VMENTRY", and VMENTRY by the guest VMM is mentioned as "virtual VMENTRY". Moreover, one example of ending the guest is mentioned as "VMEXIT". Specifically, VMEXIT to be a trigger of starting the host VMM is mentioned as "physical VMEXIT" irrespective of a type of the guest, and ending the second stage VM is mentioned as "virtual VMEXIT".

Figure 4:
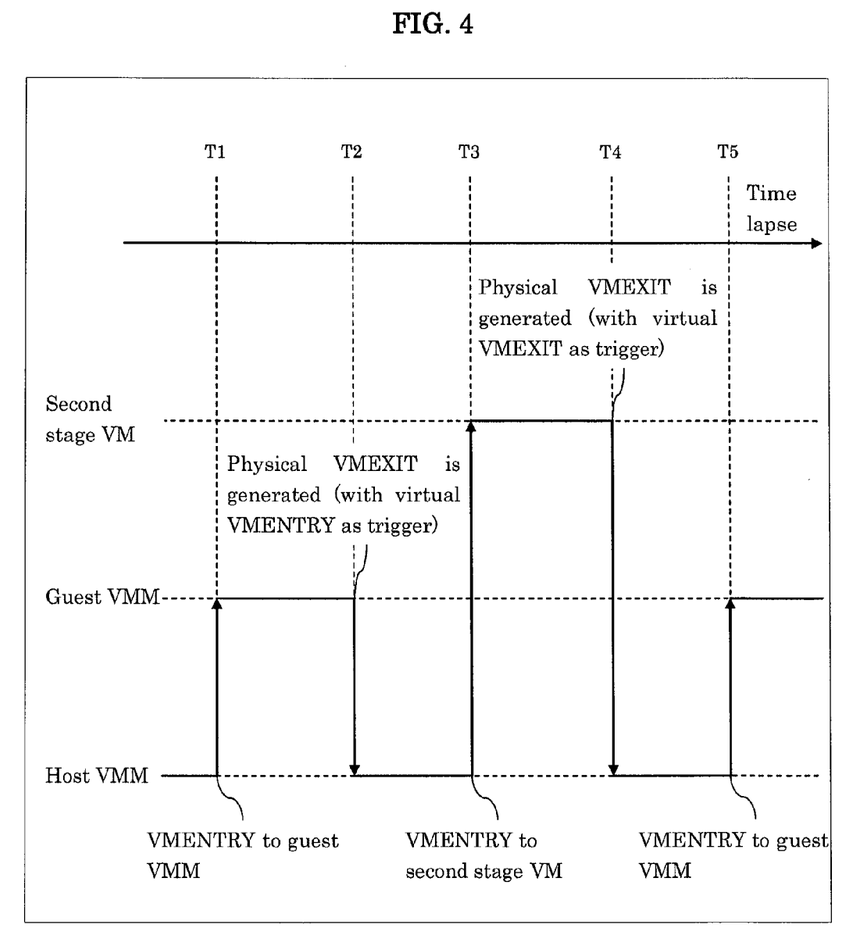
FIG. 4 is a time chart showing one example of execution of a host VMM, a guest VMM, and a second stage VM according to the embodiment 1.

FIG. 4 is a time chart showing one example of execution of the host VMM, the guest VMM, and the second stage VM.

In a time point T1, the host VMM 50 starts execution of the guest VMM 101 by the physical VMENTRY.

In a time point T2, the virtual VMENTRY is performed in order to execute the second stage VM (120, for example) by the guest VMM 101, and the physical VMEXIT is generated with the virtual VMENTRY as a trigger. As a result, execution of the guest VMM 101 is ended, and execution of the host VMM is started.

In a time point T3, the host VMM 50 starts execution of the second stage VM by the physical VMENTRY in order to process the virtual VMENTRY. The second stage VM started here is the second stage VM (120, for example) started being executed by the virtual VMENTRY. Specifically, the guest VMM 101 is configured to copy the guest VMCS to a storage region (a work region, for example) so as to perform the virtual VMENTRY by using the copied guest VMCS. Moreover, the host VMM 50 also is capable of referring to the storage region which is a copy destination of the guest VMCS. When processing the virtual VMENTRY, the host VMM 50 performs the physical VMENTRY using the guest VMCS in the storage region. As a result, execution of the second stage VM (120, for example) corresponding to the guest VMCS (170, for example) is started. Since the host VMM 50 does not grasp which guest VMCS corresponds to a particular second stage VM, for example, it is impossible for the host VMM 50 to know which second stage VM is an execution target of the physical VMENTRY in the time T3. Hereinafter, the second stage VM to be executed by the physical VMENTRY is the second stage VM 120.

In a time point T4, the physical VMEXIT is generated at a timing of the virtual VMEXIT which causes suspension of the execution of the second stage VM. Thereby, the execution of the second stage VM 120 is ended and execution of the host VMM 50 is started. Specifically, a factor that the virtual VMEXIT is generated in the second stage VM 120 (interruption occurrence, for example) is defined in the guest VMCS 170, and the virtual VMEXIT is generated in the second stage VM 120 by the physical processor 20 when the factor is detected.

In a time point T5, the host VMM 50 starts execution of the guest VMM 101 by the physical VMENTRY in order to have the guest VMM 101 perform a process corresponding to the virtual VMEXIT.

Each of a difference between the time point T3 and the time point T2 and a difference between the time point T5 and the time point T4 is an execution time of the host VMM 50. A difference between the time point T2 and the time point T1 is an execution time of the guest VMM 101. A difference between the time point T4 and the time point T3 is an execution time of the second stage VM 120 and is also an execution time to be acquired by the host VMM 50. A difference between the time point T5 and the time point T2 is an execution time of the second stage VM 120 to be acquired by the guest VMM 101.

Figure 5:
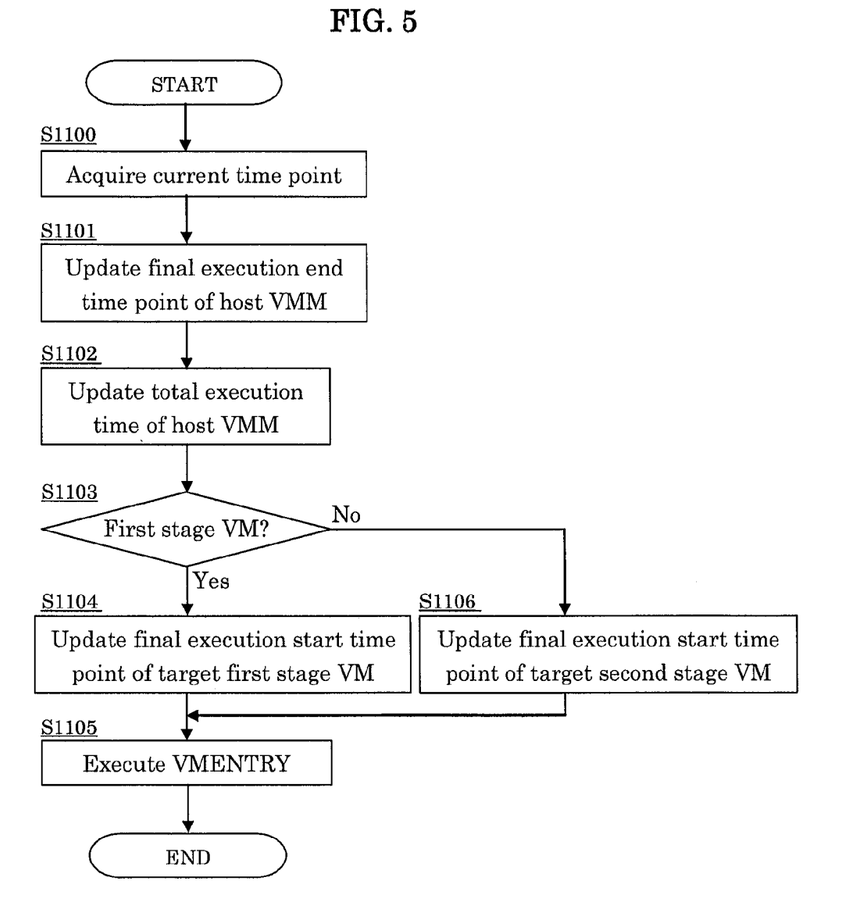
FIG. 5 is a flowchart showing a physical VMENTRY process according to the embodiment 1.
Figure 6:
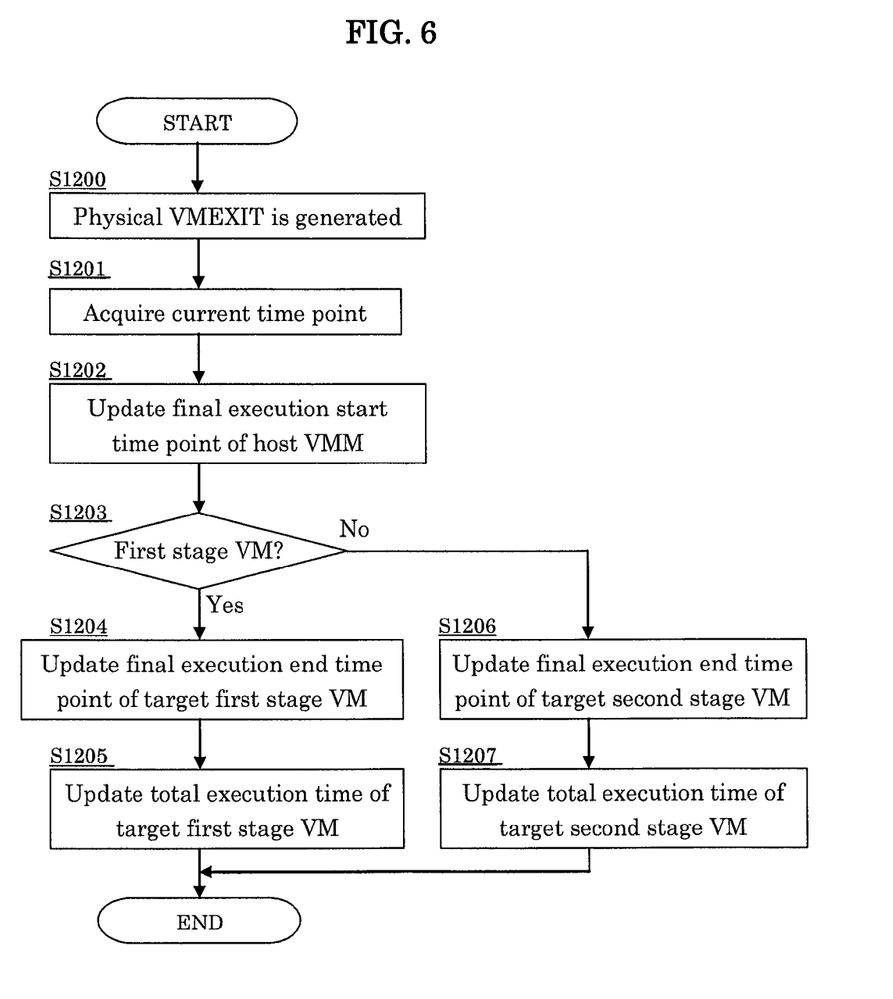
FIG. 6 is a flowchart showing a physical VMEXIT process according to the embodiment 1.
Figure 7:
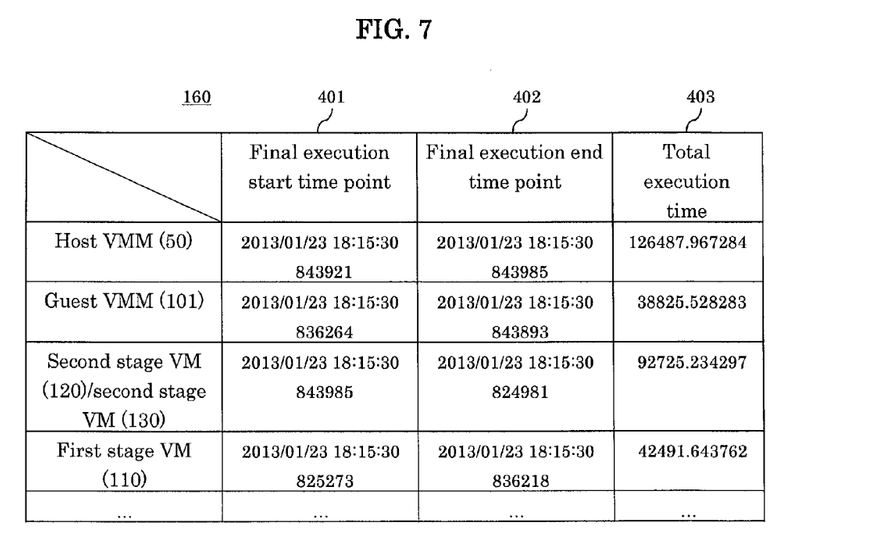
FIG. 7 shows one example of a performance management table 160 according to the embodiment 1.

FIG. 5 shows a flowchart of the physical VMENTRY process (a process for updating the table 160 during execution of the physical VMENTRY for executing the first stage VM 100 and the second stage VM 120 or 130), FIG. 6 shows a flowchart of the physical VMEXIT process (a process for updating the table 160 at a timing of the physical VMEXIT), and FIG. 7 shows one example of the performance management table 160. The following description is an example of execution of the host VMM 50, the guest VMM 101, and the second stage VM (the second stage VM 120 and the second stage VM 130) operated on the guest VMM 101.

Firstly, the performance management table 160 is explained with reference to FIG. 7.

The performance management table 160 has a final execution start time point 401, a final execution end time point 402, and a total execution time 403 with respect to the guest VMM and the second stage VM in addition to the host VMM and the first stage VM (meanings of the final execution start time point 401, the final execution end time point 402, and the total execution time 403 are substantially the same as the above-described information 201 to 2013, respectively). It is noted that, as described above, it is impossible for the host VMM 50 to know which second stage VM is a target of the physical VMENTRY and the physical VMEXIT, there is a common row for the second stage VM irrespective of the number of the second stage VMs. The host VMM 50 initializes at first each of the total execution times 403 in all rows by an initial value.

Subsequently, the physical VMENTRY process is explained with reference to FIG. 5.

In step S1100, the host VMM 50 acquires a current time point (a time point acquired by a timer) immediately before the execution of the physical VMENTRY. In step S1101, the host VMM 50 updates the final execution end time point 402 of the host VMM 50 to the time point acquired in step S1100. In step S1102, the host VMM 50 adds a difference between the final execution end time point 402 of the host VMM 50 and the final execution start time point 401 of the host VMM 50 to the total execution time 403 of the host VMM 50. In step S1103, the host VMM 50 determines which of the second stage VM (the virtual VMENTRY) or the first stage VM including the guest VMM is executed, by determining whether an execution trigger of the physical VMENTRY is the virtual VMENTRY or not.

When the first stage VM is determined in step S1103, in step S1104, the host VMM 50 updates the final execution start time point 401 of the target first stage VM (the final execution start time point 401 of the guest VMM 101, in this embodiment) to the time point acquired in step S1100.

When the first stage VM is not determined in step S1103, in step S1106, the host VMM 50 updates the final execution start time point 401 corresponding to the second stage VM (the second stage VM 120 and the second stage VM 130, in this embodiment) operated on the target first stage VM (the guest VMM 101, in this embodiment) to the time point acquired in step S1100.

The host VMM 50 executes the physical VMENTRY in step S1105 (after executing step S1104 or S1106).

Subsequently, the physical VMEXIT process is explained with reference to FIG. 6.

In step S1200, the host VMM 50 starts the process at a timing of detecting the physical VMEXIT, and acquires a current time point in step S1201. In step S1202, the host VMM 50 updates the final execution start time point 401 of the host VMM 50 to the time point acquired in step S1201. In step S1203, the host VMM 50 determines which VM, i.e., the first stage VM or the second stage VM, has been executed, on the basis of which step, i.e., step S1104 or step S1106, the process has passed through during the execution of the previous physical VMENTRY by the host VMM 50.

When the first stage VM is determined in step S1203, in step S1204, the host VMM 50 updates the final execution end time point 402 of the target first stage VM (the final execution end time point 402 of the guest VMM 101, in this embodiment) to the time point acquired in step S1201. In step S1205, the host VMM 50 adds a difference between the final execution end time point 402 of the guest VMM 101 and the final execution start time point 401 of the guest VMM 101 to the total execution time 403 of the target first stage VM (the total execution time 403 of the guest VMM 101, in this example).

When the first stage VM is not determined in step S1203, in step S1206, the host VMM 50 updates the final execution end time point 402 of the target second stage VM (the final execution end time point 402 of the second stage VM 120 and the second stage VM 130, in this embodiment) to the time point acquired in step S1201. Then, in step S1207, the host VMM 50 adds a difference between the final execution end time point 402 of the second stage VM 120 and the second stage VM 130 and the final execution start time point 401 of the second stage VM 120 and the second stage VM 130 to the total execution time 403 of the target second stage VM (the total execution time 403 of the second stage VM 120 and the second stage VM 130, in this embodiment).

As a result of the flows shown in FIG. 5 and FIG. 6, calculated and updated are the total execution time 403 of the host VMM 50, the total execution time 403 of the guest VMM 101, the total execution time 403 of the second stage VM 120 and the second stage VM 130, and the total execution time 403 of the first stage VM 110, respectively.

Figure 8:
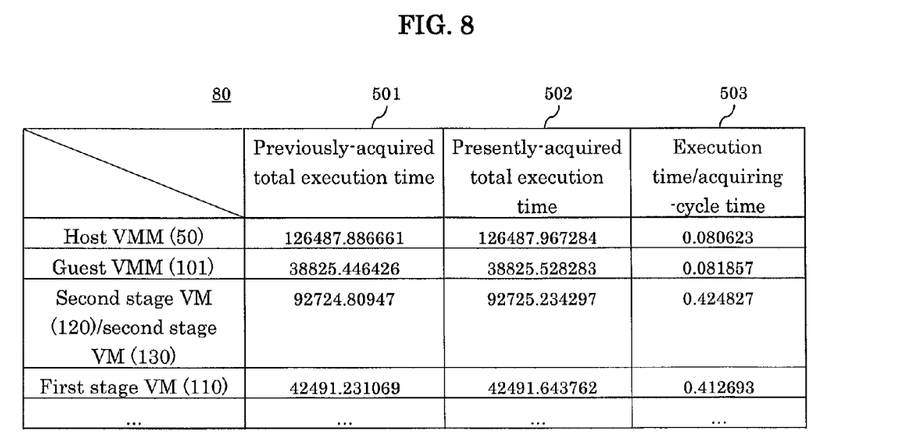
FIG. 8 shows one example of a performance management table 80 according to the embodiment 1.

FIG. 8 shows one example of the performance management table 80 of the management computer 70.

With respect to a program of each of the host VMM, the first stage VM, the guest VMM, and the second stage VM, the performance management table 80 has a previously-acquired total execution time 501, a presently-acquired total execution time 502, and an execution time/acquiring-cycle time 503. The presently-acquired total execution time 502 is equivalent to a value of the total execution time 403 presently acquired by the management computer 70 from the performance management table 160 of the host VMM 50, and the previously-acquired total execution time 501 is equivalent to a value of the total execution time 403 previously acquired by the management computer 70 from the performance management table 160 of the host VMM 50. The execution time/acquiring-cycle time 503 is a value obtained by dividing a difference between the presently-acquired total execution time 502 and the previously-acquired total execution time 501 by an acquiring-cycle time (a polling interval, for example).

The management computer 70 initializes at first each of the presently-acquired total execution times 502 in all rows by an initial value. The management computer 70 periodically acquires the total execution time 403 with respect to each program (each of the host VMM, the first stage VM, the guest VMM, and the second stage VM) from the performance management table 160 owned by the host VMM 50, so as to update the previously-acquired total execution time 501 to the presently-acquired total execution time 502 (a value of the total execution time 403 previously acquired). Then, the presently-acquired total execution time 502 is updated to the total execution time 403 presently acquired, and a value obtained by dividing a difference between the times 501 and 502 by the acquiring-cycle time is registered as the execution time/acquiring-cycle time 503. In an example shown in FIG. 8, the acquiring-cycle time is one second. It becomes possible to know the processor utilizations of the host VMM 50 and each VM (the guest VMM 101, the second stage VM (the second stage VM 120 and the second stage VM 130), and the first stage VM 110) from the execution time/acquiring-cycle time 503. The execution time/acquiring-cycle time 503 may be calculated by the host VMM 50 (or the guest VMM 101), and may be stored in the performance management table 160 (or the performance management table 180) in this case. Moreover, after the execution time/acquiring-cycle time 503 is calculated, the previously-acquired total execution time 501 is updated to a value of the presently-acquired total execution time 502.

With respect to at least the second stage VM (the second stage VM 120 and the second stage VM 130), the management computer 70 may hold a processor utilization (the execution time/acquiring-cycle time 503) for each acquiring time point, display a relationship between the acquiring time point and the execution time/acquiring-cycle time 503 (a graph representing the relationship, for example), or transmit a control command based on a change of the processor utilization to the physical computer 10 (the host VMM, for example). With respect to at least the second stage VM (the second stage VM 120 and the second stage VM 130), the user may control the physical computer 10 through the management computer 70 with reference to the relationship between the acquiring time point and the processor utilization (the execution time/acquiring-cycle time 503). For example, when the processor utilizations of a plurality of the programs seem to be intensively increased in a certain time zone (when a processor utilization of the whole physical processor 20 exceeds a predetermined value), it becomes possible to control so as to shift an execution start of the second stage VM or an execution start of the first stage VM, for example. How to control may be performed on the basis of a determination by the user, or a determination by the management computer 70 or the physical computer 10.

The embodiment 1 has been explained above. It is noted that, in the embodiment 1, the management computer 70 or the host VMM may divide a value (a value 503 or 403, for example) regarding the second stage VM (the second stage VM 120 and the second stage VM 130) into a value of each second stage VM based on a value 203 of each second stage VM in the performance management table 180. For example, the total execution time 203 of the second stage VM 120 is "100" (seconds, for example), and the total execution time 203 of the second stage VM 130 is "200". When the execution time/acquiring-cycle time 503 of the second stage VM (the second stage VM 120 and the second stage VM 130) is "0.3", the management computer 70 may calculate the execution time/acquiring-cycle time 503 of the second stage VM 120 as "0.1" by multiplying "0.3" and "1/3(=100/(100+200))" that is a ratio of the total execution time 203 of the second stage VM 120 to a sum of total execution times 203 of the second stage VM. Similarly, for example, when the total execution time 403 of the second stage VM (the second stage VM 120 and the second stage VM 130) is "120" (seconds, for example), the host VMM 50 may calculate the total execution time 403 of the second stage VM 120 as "40" by multiplying "120" and the above-described ratio "1/3".

Embodiment 2

In this embodiment, a performance management table 160' (see FIG. 11) described later is used instead of the performance management table 160. That is, a row (record) is arranged for each second stage VM. In this embodiment, the host VMM 50 may calculate the total execution time 403 for each second stage VM. Hereinafter, with reference to the drawings, a difference from the embodiment 1 is mainly described, and a description common to the embodiment 1 is omitted or simplified.

In this embodiment, the host VMM 50 uniquely identifies the second stage VM by the host VMM 50 and the guest VMM 101 cooperating with each other. Specifically, it becomes possible for the host VMM 50 to identify the second stage VM 120 and the second stage VM 130 by the guest VMM 101 explicitly separating a guest VMCS corresponding to a second stage VM (the second stage VM 120 or 130) to be executed when the virtual VMENTRY of the second stage VM is executed. As a method of explicitly separating the guest VMCS by the guest VMM 101, two methods are considered: a first method of fixedly preparing a guest VMCS address (an address of the storage region of the guest VMCS) for each second stage VM and a second method of registering an identifier of each second stage VM into each guest VMCS. In the first method, for example, the guest VMCS 170 corresponding to the second stage VM 120 is copied in a storage region belonging to the first address, and the guest VMCS 171 corresponding to the second stage VM 130 is copied in a storage region belonging to the second address. Thus, it becomes possible for the host VMM 50 to specify the storage region in which the guest VMCS is copied so as to execute the physical VMENTRY by using the guest VMCS within the specified storage region. In the second method, it becomes possible for the host VMM 50 to refer to the guest VMCS copied in the storage region so as to execute the physical VMENTRY by using the identifier recorded in the guest VMCS.

Figure 9:
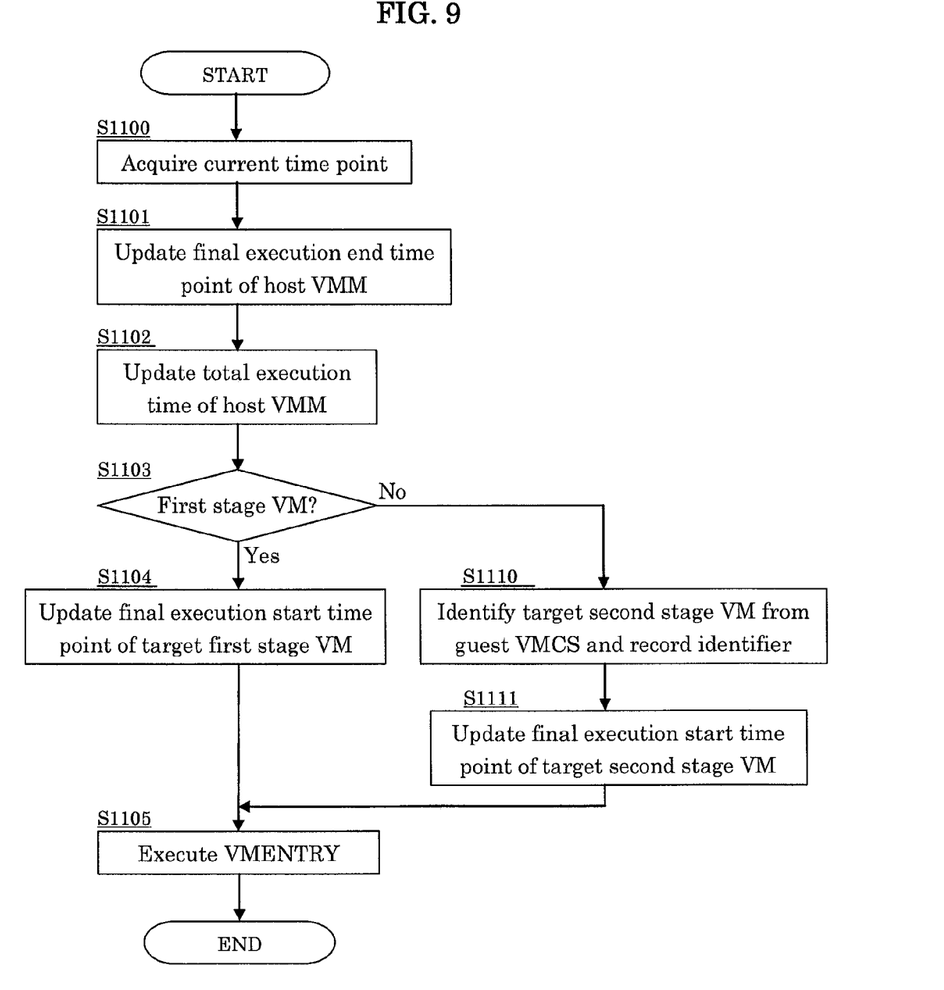
FIG. 9 is a flowchart showing a physical VMENTRY process according to an embodiment 2.
Figure 10:
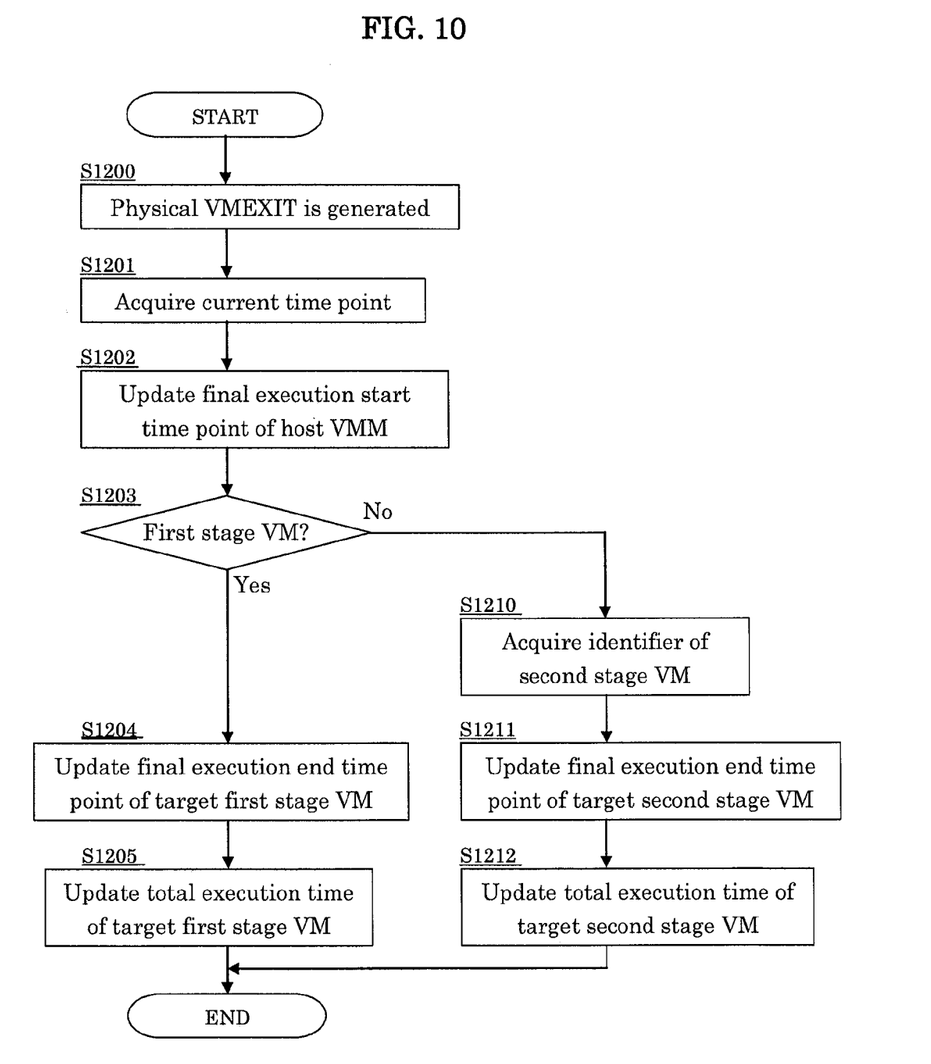
FIG. 10 is a flowchart of showing a physical VMEXIT process according to the embodiment 2.
Figure 11:
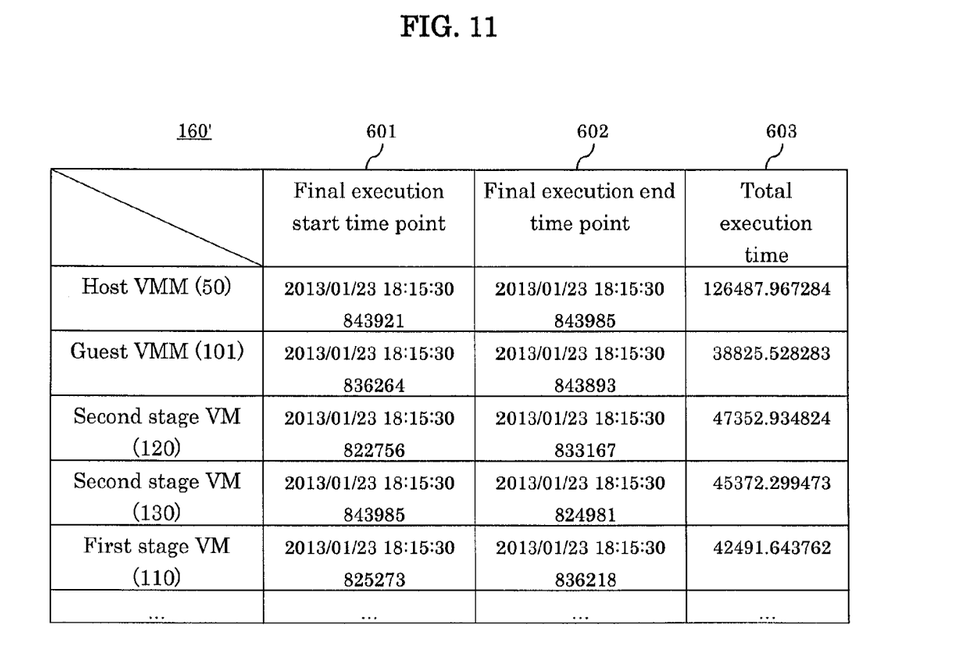
FIG. 11 shows one example of a performance management table 160' according to the embodiment 2.

FIG. 9 is a flowchart of the physical VMENTRY process according to the embodiment 2, FIG. 10 is a flowchart of the physical VMEXIT process according to the embodiment 2, and FIG. 11 shows one example of the performance management table 160'.

A difference between FIG. 5 and FIG. 9 is that step S1106 in FIG. 5 is changed to step S1110 and step S1111 in FIG. 9. In step S1110, the host VMM 50 determines from the guest VMCS whether the physical VMENTRY of the second stage VM 120 is executed or the physical VMENTRY of the second stage VM 130 is executed, so as to record an identifier of the determined second stage VM (an identifier indicating the second stage VM 120, in this embodiment) into the memory 30. In step S1111, the host VMM 50 updates the final execution start time point 401 corresponding to a second stage VM (the second stage VM 120, in this embodiment) identified from the identifier recorded in step S1110 to the time point acquired in step S1100.

A difference between FIG. 6 and FIG. 10 is that step S1206 and step S1207 in FIG. 6 are changed to step S1210 to step S1212 in FIG. 10. In step S1210, the host VMM 50 acquires the identifier of the second stage VM (the identifier indicating the second stage VM 120, in this embodiment) recorded in step S1110 in FIG. 9. In step S1211, the host VMM 50 updates the final execution end time point 402 corresponding to the second stage VM 120 identified from the identifier acquired in step S1210 to the time point acquired in step S1201. Then, in step S1212, with respect to the second stage VM 120 identified from the identifier acquired in step S1210, the host VMM 50 adds a difference between the final execution end time point 402 of the second stage VM 120 and the final execution start time point 401 of the second stage VM 120 to the total execution time 403 of the second stage VM 120.

As shown in FIG. 11, a total execution time 603 corresponding to each of the second stages VM is obtained from the flows shown in FIG. 9 and FIG. 10. According to this embodiment, it is expected that performance of the physical processor is accurately grasped for each second stage VM.

Although some embodiments are explained above, it is needless to say that the present invention is not limited to these embodiments, and numerous modification can be made without departing from the gist thereof. For example, the management computer 70 may a periodically acquire the information included in the table 160 (and the table 180). Moreover, the physical computer 10 (the physical processor 20, for example) may have the function of the management computer 70, and the management computer 70 may not necessarily exist. Moreover, the physical processor 20 (the host VMM 50, for example) may store, into the physical memory 30, the relationship between a plurality of points in time (time points) and the total execution time 403 in each row of the table 160 (160'). Moreover, with respect to at least the second stage VM (each of 120 and 130, or 120 and 130), the physical processor 20 (the host VMM 50, for example) may output (display or transmit to the management computer 70, for example) the relationship between the plurality of points in time and the total execution time 403 or the relationship between the plurality of points in time and the processor utilization (the execution time/acquiring-cycle time 503).

What is claimed is:

1. A virtual machine system, comprising:
a memory; and
a processor configured to execute a host VMM (Virtual Machine Monitor), first-stage VMs (Virtual Machine) on the host VMM, a guest VMM of the first-stage VMs, and a second-stage VM generated on the guest VMM, the processor being coupled to the memory,
wherein the processor is configured to:
perform a first determination as to whether to execute a physical VMENTRY caused by a virtual VMENTRY of the second-stage VM and a second determination as to whether a physical VMEXIT is detected as a result of a virtual VMEXIT of the second-stage VM, and
calculate an execution time of the second-stage VM based on results of the first determination and the second determination,
wherein the physical VMENTRY is a VMENTRY executed by the host VMM,
wherein the virtual VMENTRY is a VMENTRY executed by the guest VMM,
wherein the physical VMEXIT is a trigger of starting the host VMM, and
wherein the virtual VMEXIT is an end of execution of the second-stage VM.

2. The virtual machine system according to claim 1,
wherein the processor is configured to store, if the result of the first determination is true, an execution start time point of the second-stage VM into the memory, wherein the processor is configured to perform, when the physical VMEXIT is detected, the second determination, wherein the processor is configured to store, if the result of the second determination is true, store an execution end time point of the second-stage VM into the memory, and wherein the processor is configured to calculate a difference between the execution start time point and the execution end time point as the execution time of the second-stage VM.

3. The virtual machine system according to claim 2, wherein the guest VMM is configured to execute the virtually VMENTRY of the second-stage VM, and wherein the host VMM configured to execute the physical VMENTRY of the second-stage VM caused by the virtual VMENTRY of the second-stage VM, and a start of execution of the guest VMM in the first-stage VM is due to a cause different from a cause of the virtual VMENTRY of the second-stage VM, wherein the host VMM is configured to perform the first and second determinations so as to store the execution start time point and the execution end time point of the second-stage VM into the memory.

4. The virtual machine system according to claim 3, wherein a plurality of second-stage VMs are executed on the first-stage VM, wherein the host VMM is configured to identify, if a result of the first determination is true, a target second-stage VM which is a target of the virtual VMENTRY out of the plurality of second-stage VMs, and store, into the memory, an identifier of the target second-stage VM and an execution start time point of the target second-stage VM, and wherein the host VMM is configured to identify, if a result of the second determination is true, the target second-stage VM from the identifier stored in the memory, and store, into the memory, an execution end time point of the target second-stage VM.

5. The virtual machine system according to claim 3, wherein the guest VMM is configured to copy guest VM control information which is control information corresponding to the second-stage VM into a storage region which is capable of being referred to by the host VMM and is in the memory, and execute the virtual VMENTRY of the second-stage VM by using the guest VM control information copied in the storage region, and wherein the host VMM is configured to execute the physical VMENTRY of the second-stage VM by using the guest VM control information copied into the storage region.

6. The virtual machine system according to claim 1, wherein the processor is configured to update an accumulated value of the execution time of the second-stage VM in the memory every time the execution time of the second-stage VM is calculated, and wherein the processor is configured to output the accumulated value of the execution time of the second-stage VM at each of a plurality of points in time, or output a relationship between: the plurality of points in time; and the accumulated values of the execution time of the second-stage VM or information based on the accumulated values of the execution time of the second-stage VM.

7. The virtual machine system according to claim 6, comprising:

a physical computer having the memory and the processor; and a management computer coupled to the physical computer, wherein a destination of output by the processor is the management computer.

8. A method of measuring processor performance, in a virtual machine system configured to execute a host VMM (Virtual Machine Monitor), first-stage VMs (Virtual Machine) on the host VMM, a guest VMM of the first-stage VMs, and a second-stage VM generated on guest VMM, comprising:

performing a first determination as to whether to execute a physically VMENTRY caused by a virtual VMENTRY of the second-stage VM and a second determination as to whether a physical VMEXIT is detected as a result of a virtual VMEXIT of the second-stage VM; and calculating an execution time of the second-stage VM based on results of the first determination and the second determination, wherein the physical VMENTRY is a VMENTRY executed by the host VMM, wherein the virtual VMENTRY is a VMETNRY executed by the guest VMM, wherein the physical VMEXIT is a trigger of starting the host VMM, and wherein the virtual VMEXIT is an end of execution of the second-stage VM.

9. The method of measuring processor performance according to claim 8, comprising:

storing an execution start time point of the second-stage VM into the memory if a result of the first determination is true;

performing the second determination, when the physical VMEXIT is detected, storing an execution end time point of the second-stage VM into the memory if a result of the second determination is true; and calculating a difference between the execution start time point and the execution end time point as the execution time of the second-stage VM.

10. The method of measuring processor performance according to claim 8, comprising:

executing, by the guest VMM, the virtual VMENTRY of the second-stage VM;

performing, by the host VMM being configured to start execution of the guest VMM in the first-stage VM due to a cause different from a case of the virtual VMENTRY of the second-stage VM, the first determination and the physical VMENTRY of the second-stage VM caused by a virtual execution start of the second-stage VM; and performing, by the host VMM, the second determination.

* * * * *